United States Patent
Seki et al.

(10) Patent No.: US 6,769,029 B1
(45) Date of Patent: Jul. 27, 2004

(54) METHOD OF MEASURING PACKET NETWORK TRANSMISSION DELAY AND MACHINE-READABLE RECORDING MEDIUM STORING A PROGRAM FOR IMPLEMENTING THE METHOD

(75) Inventors: Yoshinaga Seki, Tokyo (JP); Hidekazu Tanno, Tokyo (JP); Yoshiharu Tanabe, Kanagawa (JP); Shinji Hasei, Hiroshima (JP); Yoshinao Nakazawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 09/634,714

(22) Filed: Aug. 7, 2000

(30) Foreign Application Priority Data

Aug. 6, 1999 (JP) ............................................ 11-223736

(51) Int. Cl.[7] .............................................. G06F 15/16
(52) U.S. Cl. ...................... 709/232; 370/241; 370/253; 370/252; 370/473
(58) Field of Search ................................ 370/253, 241, 370/473, 252

(56) References Cited

U.S. PATENT DOCUMENTS

| | | | | |
|---|---|---|---|---|
| 5,450,394 A | * | 9/1995 | Gruber et al. | 370/253 |
| 5,566,180 A | * | 10/1996 | Eidson et al. | 370/473 |
| 6,545,979 B1 | * | 4/2003 | Poulin | 370/241.1 |
| 6,671,261 B1 | * | 12/2003 | Cheung | 370/252 |

FOREIGN PATENT DOCUMENTS

JP 2-137538 5/1990

\* cited by examiner

*Primary Examiner*—Rupal Dharia
*Assistant Examiner*—Djenane Bayard
(74) *Attorney, Agent, or Firm*—Foley & Lardner LLP (57) ABSTRACT

A transmission delay measuring method used in a packet network includes the steps of: detecting by the use of first and second clocks, for each of first direction-data packets transmitted from a first terminal to a second terminal through the packet network, input and output time instants when each of the first direction-data packets enters and leaves the packet network, respectively; recording the input and the output time instants for the first direction-data packets as recorded input and recorded output time instants for the first direction-data packets; detecting by the use of the second and the first clocks, for each of second direction-data packets transmitted from the second terminal to the first terminal through the packet network, input and output time instants when each of the second direction-data packets enters and leaves the packet network, respectively; recording the input and the output time instants for the second direction-data packets as recorded input and recorded output time instants for the second direction-data packets; calculating, for each of the first direction-data packets, a first-direction provisional delay which is a first difference given by subtracting, for each of the first direction-data packets, the recorded input time instant from the recorded output time instant; calculating, for each of the second direction-data packets, a second-direction provisional delay which is a second difference given by subtracting, for each of the second direction-data packets, the recorded input time instant from the recorded output time instant; and deriving a time difference between the first and the second clocks from a first minimum value of the first-direction provisional delays and a second minimum value of the second-direction provisional delays.

11 Claims, 10 Drawing Sheets

1ST PACKET DATA GROUP 31

| | TIME (sec) | TRANS-MISSION TERMINAL | RECEPTION TERMINAL | ID |
|---|---|---|---|---|
| 31-1 | 0.00 | TERMINAL 11 | TERMINAL 12 | 0100 |
| 31-2 | 0.03 | TERMINAL 12 | TERMINAL 11 | 0200 |
| 31-3 | 0.04 | TERMINAL 11 | TERMINAL 12 | 0101 |
| 31-4 | 0.05 | TERMINAL 11 | TERMINAL 12 | 0102 |
| 31-5 | 0.11 | TERMINAL 12 | TERMINAL 11 | 0201 |
| 31-6 | 0.12 | TERMINAL 11 | TERMINAL 12 | 0103 |
| 31-7 | 0.16 | TERMINAL 12 | TERMINAL 11 | 0202 |

2ND PACKET DATA GROUP 32

| | TIME (sec) | TRANS-MISSION TERMINAL | RECEPTION TERMINAL | ID |
|---|---|---|---|---|
| 32-1 | 0.06 | TERMINAL 11 | TERMINAL 12 | 0100 |
| 32-2 | 0.07 | TERMINAL 12 | TERMINAL 11 | 0200 |
| 32-3 | 0.11 | TERMINAL 11 | TERMINAL 12 | 0101 |
| 32-4 | 0.13 | TERMINAL 11 | TERMINAL 12 | 0102 |
| 32-5 | 0.14 | TERMINAL 12 | TERMINAL 11 | 0201 |
| 32-6 | 0.18 | TERMINAL 11 | TERMINAL 12 | 0103 |
| 32-7 | 0.18 | TERMINAL 12 | TERMINAL 11 | 0202 |

DELAY DATA GROUP 3 0

| | TRANS-MISSION TERMINAL | RECEPTION TERMINAL | I D | TIME INSTANT 1 | DIREC-TION | TIME INSTANT 2 | PROVI-SIONAL DELAY | DELAY |
|---|---|---|---|---|---|---|---|---|
| DELAY DATA 30-1 | TERMINAL11 | TERMINAL12 | 0100 | 0.00 | ↑ | 0.06 | 0.06 | 0.01 |
| DELAY DATA 30-2 | TERMINAL12 | TERMINAL11 | 0200 | 0.03 | ↓ | 0.07 | -0.04 | 0.01 |
| DELAY DATA 30-3 | TERMINAL11 | TERMINAL12 | 0101 | 0.04 | ↑ | 0.11 | 0.07 | 0.02 |
| DELAY DATA 30-4 | TERMINAL11 | TERMINAL12 | 0102 | 0.05 | ↑ | 0.13 | 0.08 | 0.03 |
| DELAY DATA 30-5 | TERMINAL12 | TERMINAL11 | 0201 | 0.11 | ↓ | 0.14 | -0.03 | 0.02 |
| DELAY DATA 30-6 | TERMINAL11 | TERMINAL12 | 0103 | 0.12 | ↑ | 0.18 | 0.06 | 0.01 |
| DELAY DATA 30-7 | TERMINAL12 | TERMINAL11 | 0202 | 0.16 | ↓ | 0.18 | -0.02 | 0.03 |

METHOD OF MEASURING PACKET NETWORK TRANSMISSION DELAY AND MACHINE-READABLE RECORDING MEDIUM STORING A PROGRAM FOR IMPLEMENTING THE METHOD

BACKGROUND OF THE INVENTION

This invention relates to a method of measuring a transmission delay and, in particular, to a method of measuring a transmission delay in a packet network.

A packet network has various performance indices, one of which is a transmission delay produced when a packet is transmitted through the packet network. Such transmission delay in the network can be measured in the following manner. The packet network is connected to two monitoring terminals having clocks independent from each other. A packet is transmitted from one of the monitoring terminals to the other. The one terminal as a transmission terminal records a transmission time instant Ts when the packet is transmitted to the packet network. The other terminal as a reception terminal records a reception time instant Te when the packet is received from the packet network. By calculating the difference (Te−Ts) between the reception time instant Te and the transmission time instant Ts, the transmission delay is obtained.

In the above-mentioned technique, however, the clocks of the two monitoring terminals must be synchronized with each other. It is therefore required to install a special application program for measurement of a time difference and for clock synchronization. Without such clock synchronizing function, the delay can not be measured.

In view of the above, proposal is made of a measuring method requiring no clock synchronizing function, for example, in Japanese Unexamined Patent Publication (JP-A) No. H02-137538. The measuring method (hereinafter referred to as a conventional method) disclosed in the above-mentioned publication will be described in conjunction with FIG. 1.

Figure 1:
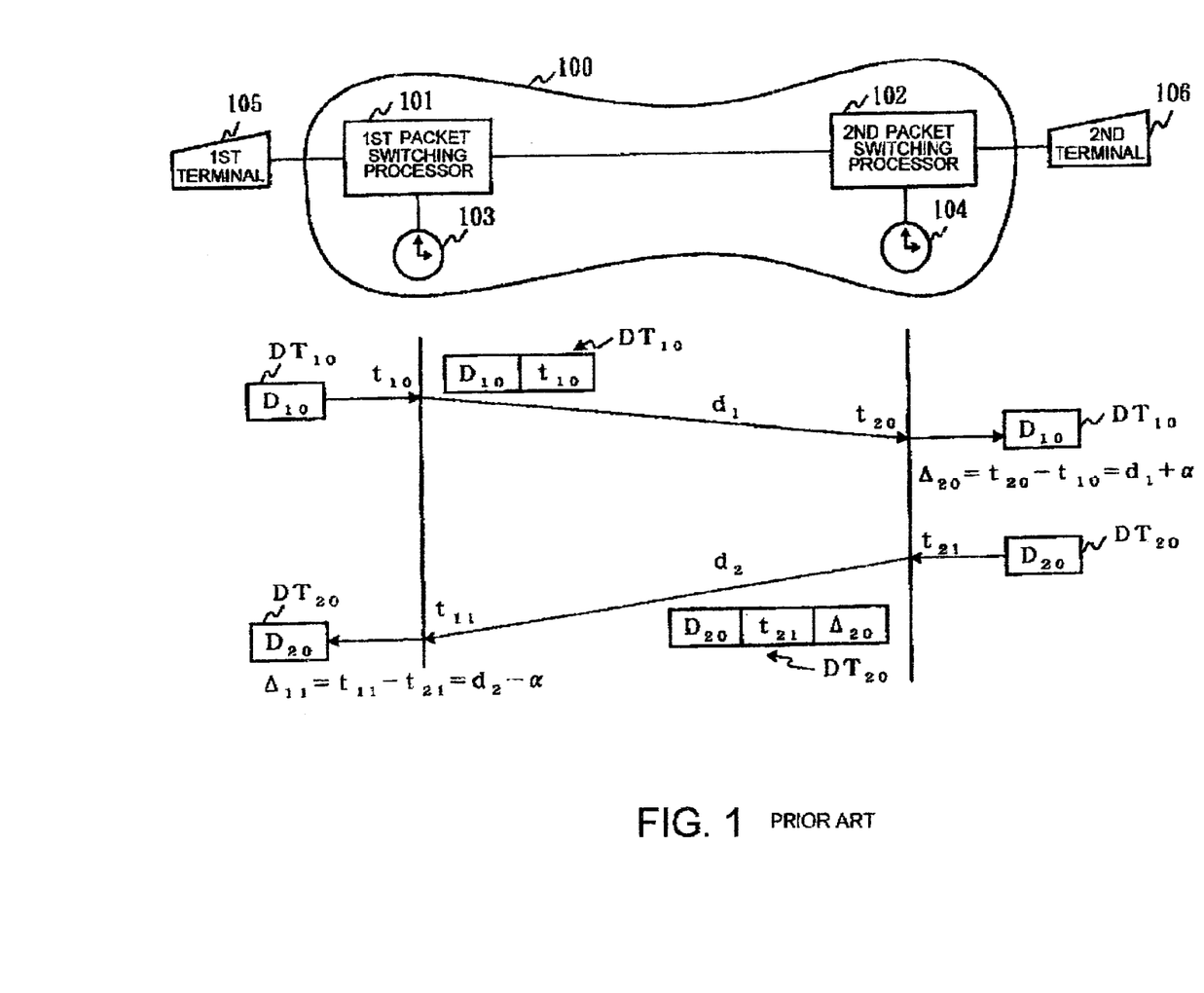
FIG. 1 is a view for describing a conventional method.

Referring to FIG. 1, a packet network 100 includes first and second packet switching processors 101 and 102 having first and second clocks 103 and 104 independent from each other, respectively. The second dock 104 is α seconds faster than the first clock 103. The first and the second packet switching processors 101 and 102 accommodate first and second terminals 105 and 106, respectively.

It is assumed that the first packet switching processor 101 is supplied from the first terminal 105 with a data packet DT10 containing data D10 and addressed to the second terminal 106. In this event the first packet switching processor 101 acquires a current time instant as a transmission time instant t10 from the first clock 103 and delivers to the second packet switching processor 102 the data packet DT10 with the transmission time instant t10 added thereto. Supplied with the data packet DT10, the second packet switching processor 102 acquires a current time instant as a reception time instant t20 from the second clock 104 and delivers to the second terminal 106 the data packet DT10 containing the data D10. Simultaneously, the second packet switching processor 102 calculates a time difference Δ20 (=t20−t10) between the reception time instant t20 and the transmission time instant t10 added to the data packet DT10.

On the contrary, it is assumed that the second packet switching processor 102 is supplied from the second terminal 106 with a data packet DT20 containing data D20 and addressed to the first terminal 105. In this event, the second packet switching processor 102 acquires a current time instant as a transmission time instant t21 from the second clock 104 and delivers to the first packet switching processor 101 the data packet DT20 with the transmission time instant t21 and the above-mentioned time difference Δ20 added thereto. Supplied with the data packet DT20, the first packet switching processor 101 acquires a current time instant as a reception time instant t11 from the first clock 103 and delivers to the first terminal 105 the data packet DT20 containing the data D20. Simultaneously, the first packet switching processor 101 calculates a time difference Δ11 (=t11−t21) between the reception time instant t11 and the transmission time instant t21 added to the data packet DT20. Furthermore, the first packet switching processor 101 calculates a sum of the time differences Δ11 and Δ20, i.e., a total delay (Δ11+Δ20) required for round-trip transmission, including forward transmission and backward transmission, of a data packet through the packet network 100.

It is supposed that, during the forward transmission and the backward transmission of the data packets DT10 and DT20 through the packet network 100, network delays d1 and d2 are produced, respectively. Then, the above-mentioned time differences Δ11 and Δ20 are represented by:

$$\Delta 20 = t20 - t10 = d1 + \alpha$$

$$\Delta 11 = t11 - t21 = d2 - \alpha$$

From the foregoing, the total delay (ΔA+Δ20) is calculated as:

$$\Delta 11 + \Delta 20 = (d1 + \alpha) + (d2 - \alpha) = d1 + d2$$

Thus, the total delay is given as the sum of the network delays d1 and d2 and does not contain the time difference α between the first and the second clocks 103 and 104.

The above-mentioned measurement is repeatedly carried out for each of a large number of data packets transferred through the packet network 100 to obtain a large number of total delays. Thus, the delays produced while the data packets flow through the packet network 100 are statistically obtained.

In the above-mentioned conventional method, it is possible to statistically obtain the delays in the packet network without requiring the clock synchronization. However, each individual delay thus obtained is a round-trip delay as a total sum of a forward-transmission delay and a backward-transmission delay in the packet network. In other words, it is impossible to individually obtain a transmission delay for each of the forward transmission and the backward transmission.

SUMMARY OF THE INVENTION

It is therefore an object of this invention to provide a method of measuring a transmission delay for a packet flowing through a packet network in which the delay can be measured individually for each of forward transmission and backward transmission without requiring clock synchronization.

It is another object of this invention to provide a recording medium which stores an application program for implementing the above-mentioned method.

According to this invention, there is provided a method of measuring a transmission delay in a packet network, comprising the steps of (a) detecting, for each of a plurality of data packets transmitted and received between first and second terminals through the packet network, input and output time instants when the data packet enters and leaves the packet network, respectively, by the use of first and second clocks independent from each other and recording the input and the output time instants as recorded input and recorded output time instants; (b) calculating, for each data packet transmitted from the first terminal to the second terminal in a first direction, a difference between the recorded output and the recorded input time instants as a first-direction provisional delay and calculating, for each data packet transmitted from the second terminal to the first terminal in a second direction, a difference between the recorded output and the recorded input time instants as a second-direction provisional delay; and (c) deriving a time difference between the first and the second clocks from minimum values of the first-direction and thie second-direction provisional delays.

The method of this invention may further comprise the step of (d) correcting the first-direction and the second-direction provisional delays by the use of the time difference derived as mentioned above.

The step (a) of detecting and recording the input and the output time instants may be carried out by the first and the second terminals themselves, by packet monitoring terminals for capturing, at an inlet and an outlet of the packet network, the packets transmitted and received between the first and the second terminals, or by processors such as packet switching units accommodating the first and the second terminals, respectively.

It is assumed that the second clock is $\alpha$ seconds faster than the first clock. The transmission delay of the packet network varies in dependence upon various factors such as the number of packets flowing into the packet network and the data length of each packet but has a minimum value such that no smaller value exist. The minimum value can be assumed to be equal to a particular value irrespective of packet flowing directions without leading to no substantial error. Such particular value is represented by d. On the other hand, the minimum values of the first-direction and the second-direction provisional delays are represented by $\Delta 1$ and $\Delta 2$, respectively. Then, the minimum values of the first-direction and the second-direction provisional delays $\Delta 1$ and $\Delta 2$ are given by:

$$\Delta 1 = d + \alpha$$

$$\Delta 2 = d - \alpha$$

The time difference $\alpha$ can be obtained from this two-element simultaneous linear equations. By correcting each of the first-direction and the second-direction provisional delays with the time difference $\alpha$, the transmission delays of the packets flowing through the packet network can be measured individually for each of forward transmission and backward transmission in the first and the second directions without requiring clock synchronization between the first and the second clocks.

DESCRIPTION OF PREFERRED EMBODIMENTS

Now, description will be made in detail about embodiments of this invention with reference to the drawing.

Figure 2:
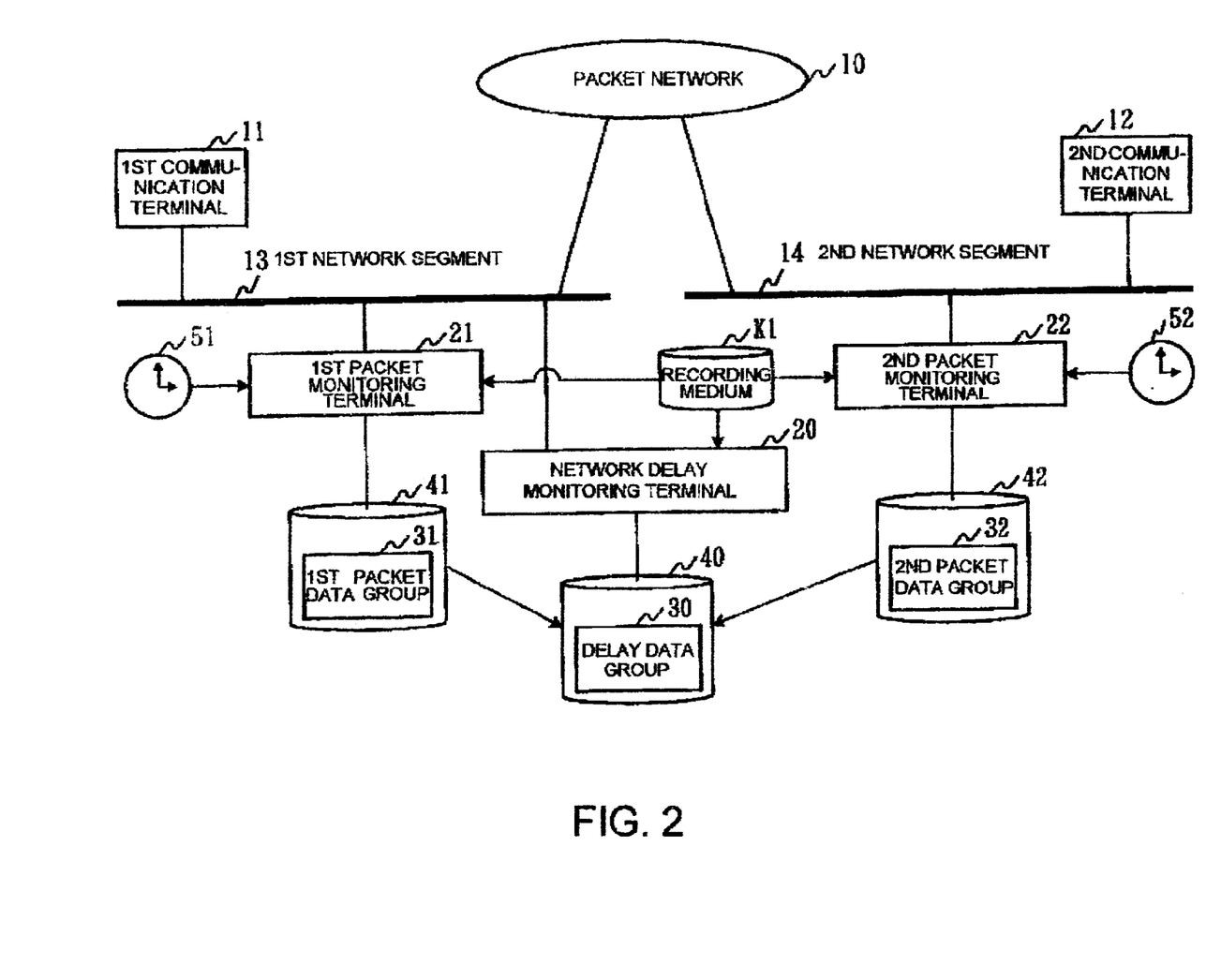
FIG. 2 is a block diagram of a packet network system to which this invention is applied.

At first referring to FIG. 2, a packet network system to which this invention is applied includes a packet network 10, a first communication terminal 11 connected to the packet network 10 through a first network segment 13, a second communication terminal 12 connected to the packet network 10 through a second network segment 14, a first packet monitoring terminal 21 connected to the first network segment 13, a first memory unit 41 connected to the first packet monitoring terminal 21, a second packet monitoring terminal 22 connected to the second network segment 14, a second memory unit 42 connected to the second packet monitoring terminal 22, a network delay monitoring terminal 20 connected to the first network segment 13, and a memory unit 40 connected to the network delay monitoring terminal 20.

The packet network 10 comprises a plurality of processors (nodes), such as a packet switching unit and a repeater unit, connected through communication channels to one another, although not illustrated in the figure. The first and the second communication terminals 11 and 12 illustrated in FIG. 2 are optionally selected from a number of communication terminals carrying cut packet transmission and reception through the packet network 10. Any two communication terminals can be selected as the first and the second communication terminals 11 and 12 as far as bidirectional packet transmission is carried out therebetween through the packet network 10. A packet from the first communication terminal 11 to the second communication terminal 12 is delivered through the first network segment 13, the packet network 10, and the second network segment 14 to the second communication terminal 12. On the contrary, a packet from the second communication terminal 12 to the first communication terminal 11 is delivered through the second network segment 14, the packet network 10, and the first network segment 13 to the first communication terminal 11. Herein, each of the first and the second network segments 13 and 14 may be implemented by a LAN (Local Area Network).

The first packet monitoring terminal 21 detects an input time instant when the packet transmitted from the first communication terminal 11 and addressed to the second communication terminal 12 enters the packet network 10 and an output time instant when the packet transmitted from the second communication terminal 12 and addressed to the first communication terminal 11 leaves the packet network 10. To this end, the first packet monitoring terminal 21 is connected to the first network segment 13 which serves as an inlet/outlet port of the packet network 10 as seen from the first communication terminal 11. Likewise, the second packet monitoring terminal 22 detects an input time instant when the packet transmitted from the second communication terminal 12 and addressed to the first communication terminal 11 enters the packet network 10 and an output time instant when the packet transmitted from the first communication terminal 11 and addressed to the second communication terminal 12 leaves the packet network 10. To this end, the second packet monitoring terminal 22 is connected to the second network segment 14 which serves as an inlet/outlet port of the packet network 10 as seen from the second communication terminal 12.

The first packet monitoring terminal 21 has a first clock 51 having a time accuracy of 10 msec. The time accuracy of 10 msec means that a current time instant is renewed or re-adjusted at every 10 msec. The first packet monitoring terminal 21 monitors packet header information of an IP (Internet Protocol) packet flowing through the first network segment 13. Upon detection of appearance of particular packet header information on the first network segment 13, i.e., packet header information indicating that the packet in consideration is transmitted from the first communication terminal 11 as a transmission terminal to the second communication terminal 12 as a reception terminal or from the second communication terminal 12 as a transmission terminal to the first communication terminal 11 as a reception terminal, the first packet monitoring terminal 21 captures the particular packet and acquires from the first clock 51 a current time instant when the particular packet header information is detected. The first packet monitoring terminal 21 produces packet data at least containing the current time instant thus acquired, direction information identifying a packet flowing direction, and a packet ID contained in the packet header information and supplies the packet data to the first memory unit 41 for storage therein. The memory unit 41 has a first packet data group 31 comprising a set of the packet data produced and stored as mentioned above.

On the other hand, the second packet monitoring terminal 22 has a second clock 52 which has a time accuracy of 10 msec equal to that of the first clock 51 but which may not be synchronized with the first clock 51. The second packet monitoring terminal 22 monitors packet header information of an IP packet flowing through the second network segment 14. Upon detection of appearance of particular packet header information on the second network segment 14, i.e., packet header information indicating that the packet in consideration is transmitted from the first communication terminal 11 as a transmission terminal to the second communication terminal 12 as a reception terminal or from the second communication terminal 12 as a transmission terminal to the first communication terminal 11 as a reception terminal, the second packet monitoring terminal 22 captures the particular packet and acquires from the second clock 52 a current time instant when the particular packet header information is detected. The second packet monitoring terminal 22 produces packet data at least containing the current time instant thus acquired, direction information identifying a packet flowing direction, and a packet ID contained in the packet header information and supplies the packet data to the second memory unit 42 for storage therein. The memory unit 42 has a second packet data group 32 comprising a set of the packet data produced and stored as mentioned above.

In this embodiment, the IP packet is mentioned by way of example. However, any different kind of packet may be used as far as the transmission terminal, the reception terminal, and the packet can be identified upon communication. Although the time accuracy of each of the first and the second clocks is equal to 10 msec in the foregoing description, the time accuracy may have any different value as far as it is in common to the first and the second packet monitoring terminals.

Then, the network delay monitoring terminal 20 acquires the first and the second packet data groups 31 and 32 stored in the first and the second memory units 41 and 42 by the first and the second packet monitoring terminals 21 and 22. The network delay monitoring terminal 20 analyzes the first and the second packet data groups 31 and 32 to produce a delay data group 30 containing true transmission delays of the respective packets transmitted and received between the first and the second communication terminals 11 and 12. In FIG. 2, the network delay monitoring terminal 20 is connected to the first network segment 13. Therefore, the network delay monitoring terminal 20 on ore hand acquires the first packet data group 31 from the first packet monitoring terminal 21 through the first network segment 13 and on the other hand acquires the second packet data group 32 from the second packet monitoring terminal 22 through the second network segment 14, the packet network 10, and the first network segment 13. The network delay monitoring terminal 20 may be arranged at any position as far as the first and the second packet data groups 31 and 32 can be acquired. For example, the network delay monitoring terminal 20 may be connected to the second network segment 14 or may be arranged at any other position apart from the first and the second network segments 13 and 14. Alternatively, each of the first and the second memory units 41 and 42 may be implemented by a floppy disk or an MO (Magneto Optical) desk. In this case, the first and the second memory units 41 and 42 with the first and the second packet data groups 31 and 32 stored therein can be transferred to any piece where the network delay monitoring terminal 20 is located. As a consequence the network delay monitoring terminal 20 need not be connected to the packet network 10. In case where the function of producing the delay data group 30 from the first and the second packet data groups 31 and 32 is implemented by an application program, the first and the second packet monitoring terminals 21 and 22 may assume the function of the network delay monitoring terminal 20.

Now, the operation according to this embodiment will be described in detail.

In FIG. 2, bidirectional packet communication is carried out between the first and the second communication terminals 11 and 12 through the first network segment 13, the packet network 10, and the second network segment 14. In this event, each of the first and the second packet monitoring terminals 21 and 22 executes the operation illustrated in FIG. 3. For execution of the operation illustrated in FIG. 3, a monitoring program is recorded in a machine-readable recording medium K1, such as a CD-ROM (Compact Disk-Read Only Memory), a magnetic disk, and a semiconductor memory, and is read from the recording medium K1 and loaded into each of the first and the second packet monitoring terminals 21 and 22 when the first and the second packet monitoring terminals 21 and 22 are started up.

Figure 3:
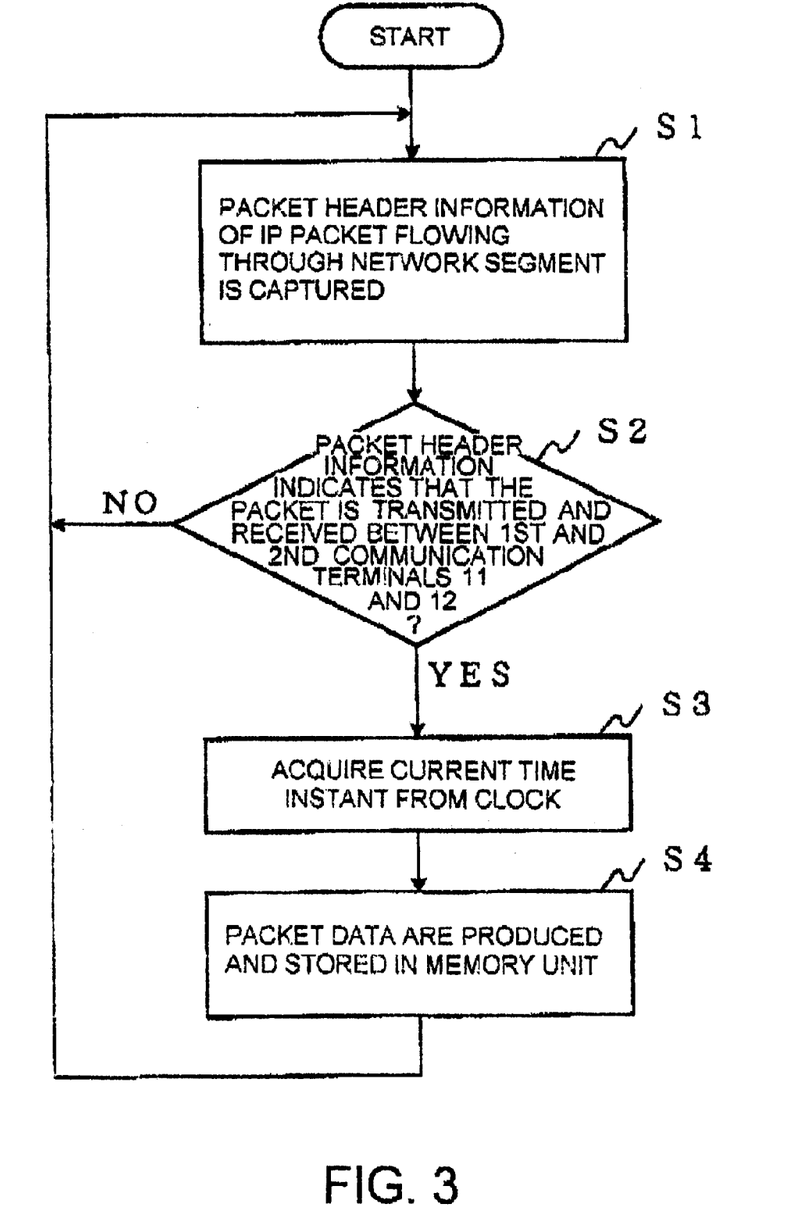
FIG. 3 is a flow chart for describing the operation of packet monitoring terminals in the system illustrated in FIG. 2.

At first, the packet header information of the IP packet flowing through each of the first and the second network segments 13 and 14 is captured (step S1). Next, the packet header information thus captured is analyzed to judge whether or not the packet header information indicates that the packet in consideration is transmitted and received between the first and the second communication terminals 11 and 12 (step S2). Herein, judgment is carried out with reference to sender information and destination information contained in the packet header information. If the packet in consideration is not transmitted between the first and the second communication terminals 11 and 12 (NO in step S2), the operation returns to the step S1 to capture next packet header information. If the packet in consideration is transmitted between the first and the second communication terminals 11 and 12 (YES in step S2), each of the first and the second packet monitoring terminals 21 and 22 acquires the current time instant from each of the first and the second clocks 51 and 52 (step S3). Each of the first and the second packet monitoring terminals 21 and 22 produces packet data containing the current time instant acquired as mentioned above, the sender information, the destination information, and the packet ID contained in the packet header information and makes each of the first and the second memory units 41 and 42 store the packet data in a time sequential fashion (step S4). Then, the operation returns to the step S1 to capture another packet header information.

Figure 4:
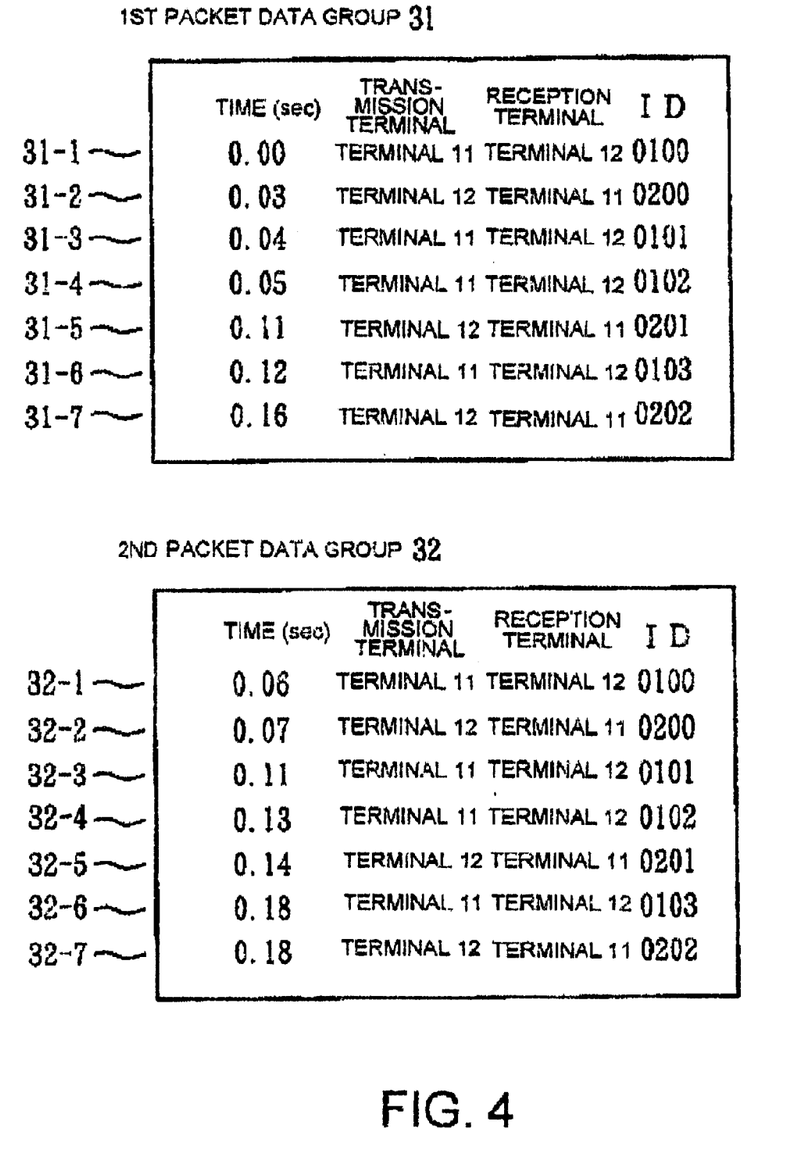
FIG. 4 shows packet data groups recorded in the packet monitoring terminals.

In the above-mentioned manner, the first and the second packet data groups 31 and 32 are stored in the first and the second memory units 41 and 42, respectively. Referring to FIG. 4, the first packet date group 31 comprises packet data 31-1 through 31-7 while the second packet data group 32 comprises packet data 32-1 and 32-7. Each of the packet data 31-1 through 31-7 and 32-1 through 32-7 contains the time instant, designation of the transmission terminal, designation of the reception terminal, and the packet ID. Since the packet transmitted and received between the first and the second communication terminals 11 and 12 inevitably passes through both of the first and the second network segments 13 and 14, the packet data related to each single packet are stored in both of the first and the second memory units 41 and 42. For example, both of the first packet data 31-1 in the first packet data group 31 and the first packet data 32-1 in the second packet data group 32 are related to a single common packet having the packet ID "0100".

The first and the second packet monitoring terminals 21 and 22 repeatedly carry out the production and the storage of the first and the second packet data groups 31 and 32 as mentioned above until the packet data are obtained to the amount such that statistical analysis is performed with sufficiently high accuracy.

Next referring to FIGS. 5 and 6, description will be made of the operation of the network delay monitoring terminal 20 which produces the delay data group 30 from the first and the second packet data groups 31 and 32.

Figure 5:
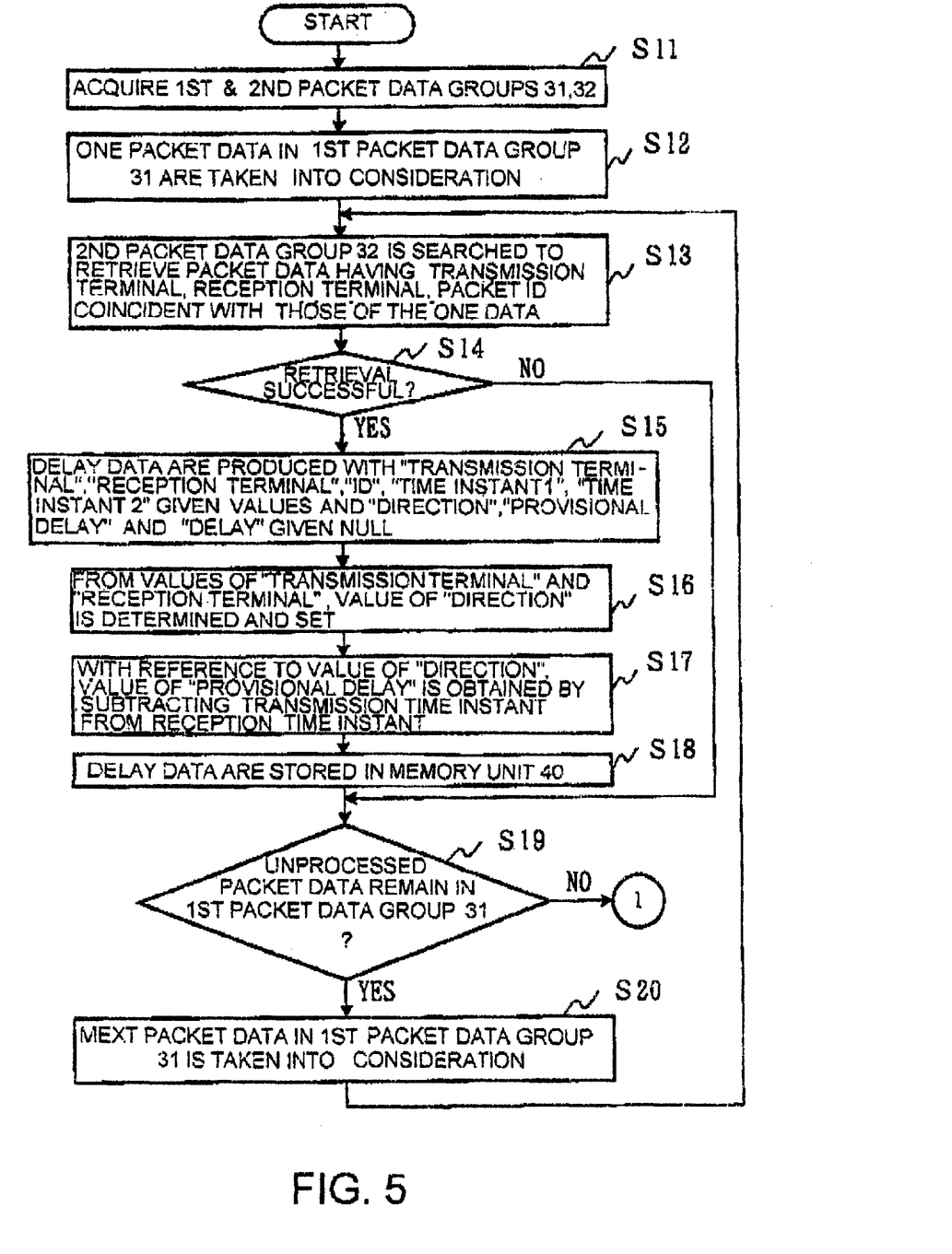
FIG. 5 is a flow chart for describing a first part of the operation of a network delay monitoring terminal.
Figure 6:
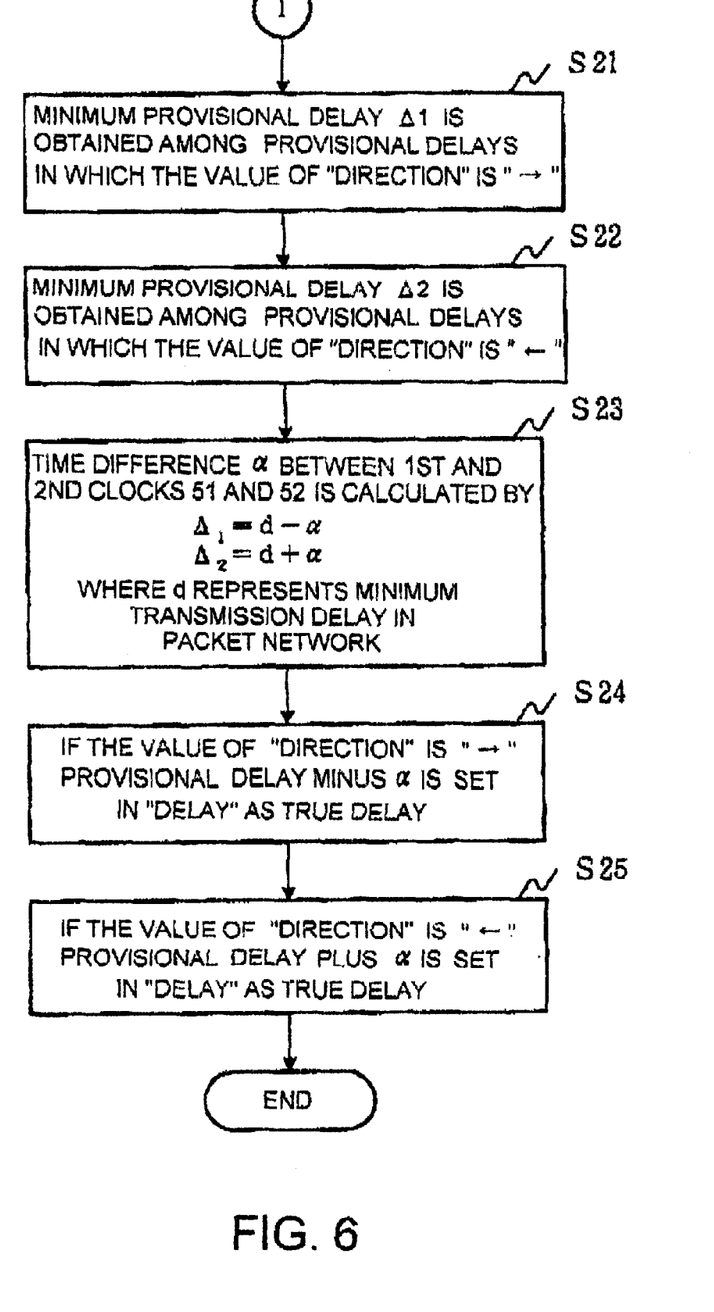
FIG. 6 is a flow chart for describing the second part of the operation of the network delay monitoring terminal.

For execution of the operation illustrated in FIGS. 5 and 6, a monitoring program is recorded in the recording medium K1 and is read from the recording medium K1 to be loaded into the network delay monitoring terminal 20 when the network delay monitoring terminal 20 is started up.

At first referring to FIG. 5, the network delay monitoring terminal 20 acquires the first and the second datagroups 31 and 32 from the first and the second memory units 41 and 42, respectively, and makes their copies which are stored into an internal memory (step S11). Next, one packet data in the first at packet data group 31, i,e., the packet data 31-1 are taken into consideration (step S12) to be subjected to the following steps.

The second packet data group 32 is searched to retrieve packet data containing the designation of the transmission terminal, the designation of the reception terminal, and the packet ID all of which are coincident with those of the packet data 31-1 in consideration (step S13). In the example being illustrated in FIG. 4, the packet data 32-1 are retreved. If the second packet data group 32 has no packet data corresponding to the packet data 31-1 in consideration because of a failure in capturing the packets (NO in step S14), the steps S15 through S18 are skipped. When the retrieval is successful (YES in step S14), delay data having eight items are produced (step S15). Specifically, the eight items include "Transmission Terminal", "Reception Terminal". "Packet ID", "Time Instant 1", "Direction", "Time Instant 2", "Provisional Delay", and "Delay". In the example being described, the items "Transmission Terminal", "Reception Terminal", and "Packet ID" are given the designation of the transmission terminal 11, the designation of the reception terminal 12, and the packet ID "0100" in the packet data 31-1 in consideration. The item "Time Instant 1" is given the time instant "0.00" in the packet data 31-1 in consideration. The item "Time Instant 2" is given the time instant "0.06" in the packet data 32-1 retrieved as mentioned above. The remaining items "Direction", "Provisional Delay", and "Delay" are given the value "NULL" (step S15).

Subsequently, the value of the item "Direction" is determined by the items "Transmission Terminal" and "Reception Terminal" and set in this item (step S18). Specifically, if the items "Transmission Terminal" and "Reception Terminal" indicate the first and the second communication terminals 11 and 12, respectively, the item "Direction" is given the value "→". If the items "Transmission Terminal" and "Reception Terminal" indicate the second and the first communication terminals 12 and 11, respectively, the item "Direction" is given the value "←". In the example being described, the item "Direction" is given the value "→".

Next, with reference to the value of the item "Direction", the transmission time instant is subtracted from the reception time instant to obtain a provisional delay which is set in the item "Provisional Delay" (step S17). If the value of the item "Direction" is "→", the item "Time Instant 2" given the time instant on the side of the second packet data group 42 is the reception time instant while the item "Time Instant 1" given the time instant on the side of the first packet data group 41 is the transmission time instant. If the value of the item "Direction" is "→", the item "Time Instant 1" given the time instant on the side of the first packet data group 41 is the reception time instant while the item "Time Instant 2" given the time instant on the side of the second packet data group 42 is the transmission time instant. In the example being described, the item "Direction" is "→". Therefore, the item "Provisional Delay" is given the value of 0.06 obtained by subtracting the value 0.00 of the item, "Time Instant 1" from the value 0.06 of the item "Time Instant 2".

After the items except the item "Delay" are given the values as mentioned above, the delay data are stored in the memory unit 40 (step S18). At this time instant, the memory unit 40 stores delay data 30-1 in a delay data group 30 illustrated in FIG. 7. In the delay data 30-1, the item "Delay" is given the value "NULL".

After completion of the above-mentioned steps for the packet data 31-1 in the first packet data group 31, the network delay monitoring terminal 20 judges whether or not unprocessed packet data remain in the first packet data group 31 (step S19). If any, next packet data in the first packet data group 31 is taken into consideration (step S20). The operation returns to the step S13 to repeat the above-mentioned steps for the next packet data. In the example illustrated in FIG. 4, the packet data 31-2, 31-3, . . . , 31-7 are successively processed. After all of the packet data in the first packet data group 31 are processed (NO in step S19), the operation proceeds to the part illustrated in FIG. 6. At this time instant, the memory unit 40 stores the delay data 30-1 through 30-7 in the delay data group 30 illustrated in FIG. 7. In each of these delay data, the item "Delay" is given the value "NULL".

In the operation illustrated in FIG. 6, a minimum provisional delay is obtained for each direction. Specifically, among the delay data 30-1 through 30-7 stored in the memory unit 40, all of those delay data in which the item "Direction" is given the value "→" are picked up to detect the minimum value of the item "Provisional Delay" as the minimum provisional delay $\Delta1$ (step S21). In the example illustrated in FIG. 7, the provisional delay is minimum in the delay data 30-1 and 30-6. Therefore. the minimum provisional delay $\Delta1$ is equal to 0.06. Likewise, all of those delay data in which the item "Direction" is given the value "←" are picked up to detect the minimum value of the item "Provisional Delay" as the minimum provisional delay $\Delta2$ (step S22). In the example illustrated in FIG. 7, the provisional delay is minimum in the delay data 30-2. Therefore, the minimum provisional delay $\Delta2$ is equal to −0.04.

Then, the time difference of the second clock 52 with respect to the first clock 51, i.e., the time duration by which the second clock 52 is faster than the first clock 51 is represented by $\alpha$ and the minimum transmission delay in the packet network 10 is represented by d. The time difference α is calculated by two-element simultaneous linear equations (step S23):

$$\Delta 1 = d - \alpha$$

$$\Delta 2 = d + \alpha$$

In the example being described, Δ1 and Δ2 are equal to 0.06 and −0.04, respectively. Therefore, the time difference α is equal to 0.05.

Figure 7:
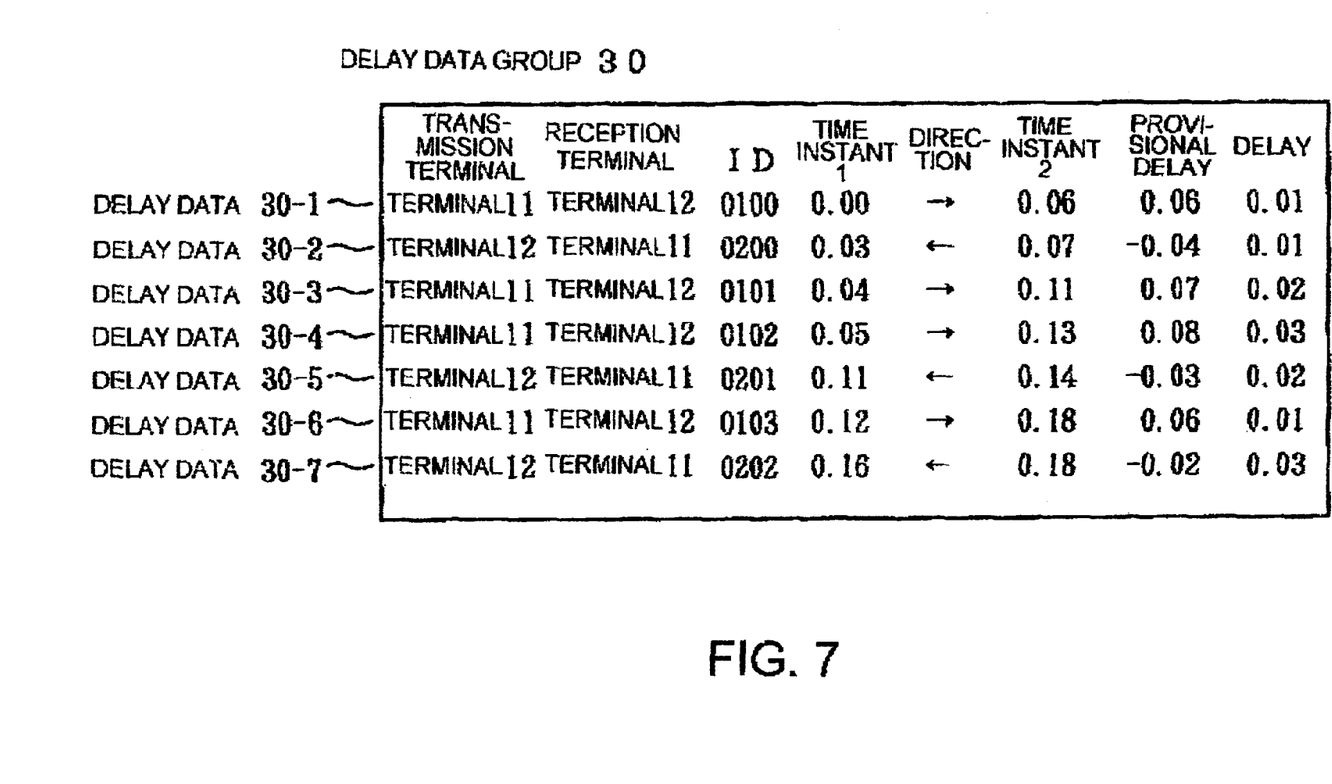
FIG. 7 shows a delay data group recorded in the network delay monitoring terminal.

Next, the provisional delay in the delay data group 30 is corrected by the time difference α obtained as mentioned above. Specifically, for each of the delay data 301 through 30-7 in the delay data group 30, the value of the item "Provisional Delay" minus α is given to the item "Delay" as a true transmission delay if the item "Direction" has the value "→" (step S24). On the other hand, if the item "Direction" has the value "→", the value of the item "Provisional Delay" plus α is given to the item "Delay" as a true transmission delay (step S25). As a result, the values of the item "Delay" in the delay data 30-1 through 30-7 are obtained as illustrated in FIG. 7. Thus, it is possible to obtain the true transmission delays required for the respective packets to flow through the packet network 10.

In the embodiment described above, the following effects can be obtained.

First, the transmission delay for each packet flowing through the packet network can be measured even if the first and the second clocks 51 and 52 of the packet monitoring terminals 22 and 23 are not synchronized with each other preliminarily. In addition, it is possible to individually measure the transmission delay of each packet flowing through the packet network 10 in the direction from the communication terminal 11 to the communication terminal 12 and the transmission delay of each packet flowing in the opposite direction.

Second, the network transmission delay is measured by the use of the packets transmitted between the communication terminals 11 and 12 optionally selected from those carrying out bidirectional packet communication through the packet network 10. Thus, any special test packet for measurement of the transmission delay need not be transmitted through the packet network 10 so as to prevent the load upon the packet network 10 from being increased because of the measurement of the transmission delay.

Third, unlike the conventional method, each node of the packet network 10 need not be modified and the packet flowing therethrough need not be provided with a special field. Therefore, this method can be applied to a wide variety of existing packet networks.

Figure 8:
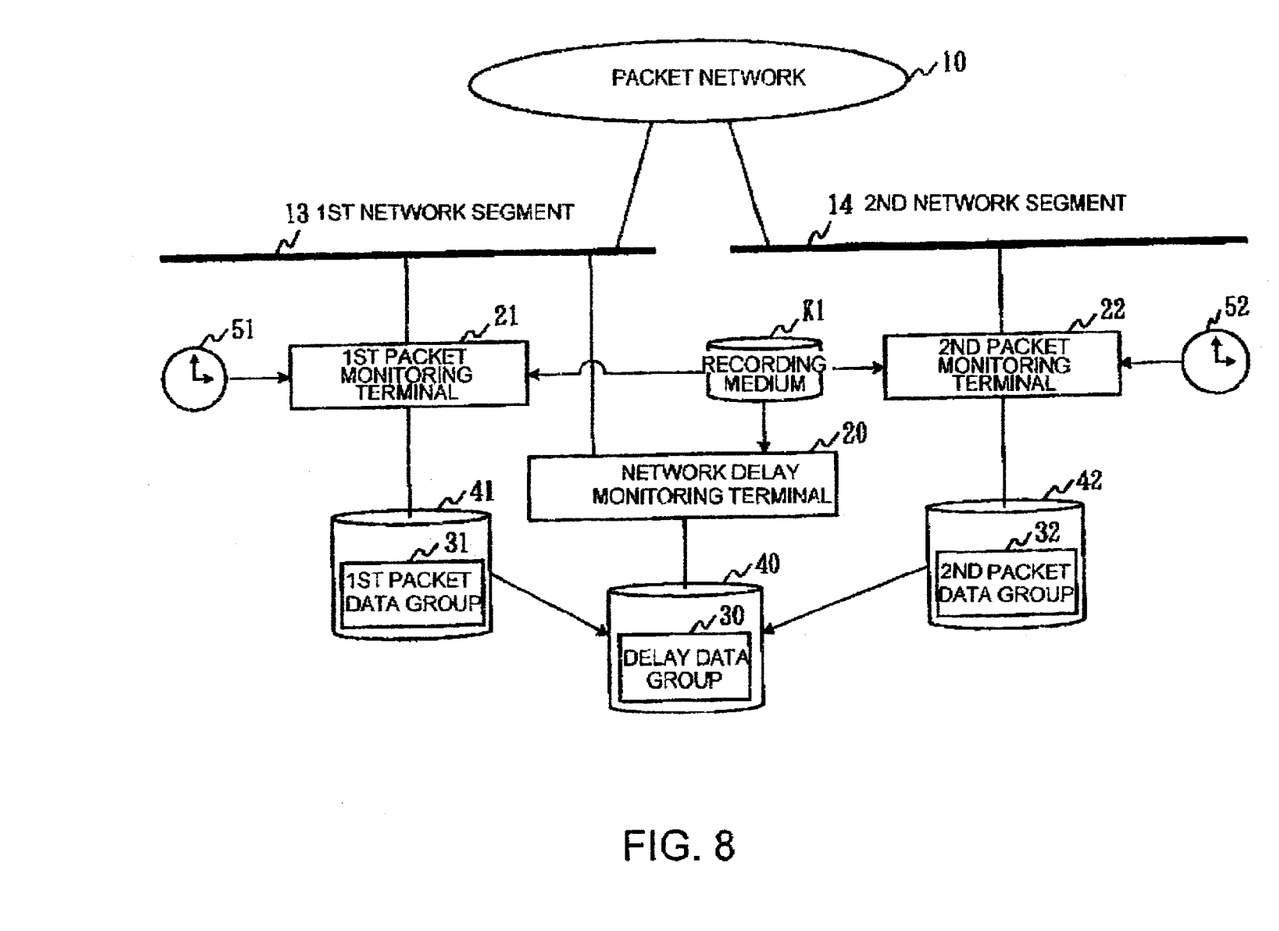
FIG. 8 is a block diagram of another packet network system to which this invention is applied.

Referring to FIG. 8, another packet network system to which this invention is applied is similar to that illustrated in FIG. 2 except that the first and the second packet motoring terminals 21 and 22 themselves carry out packet transmission and reception.

Figure 9:
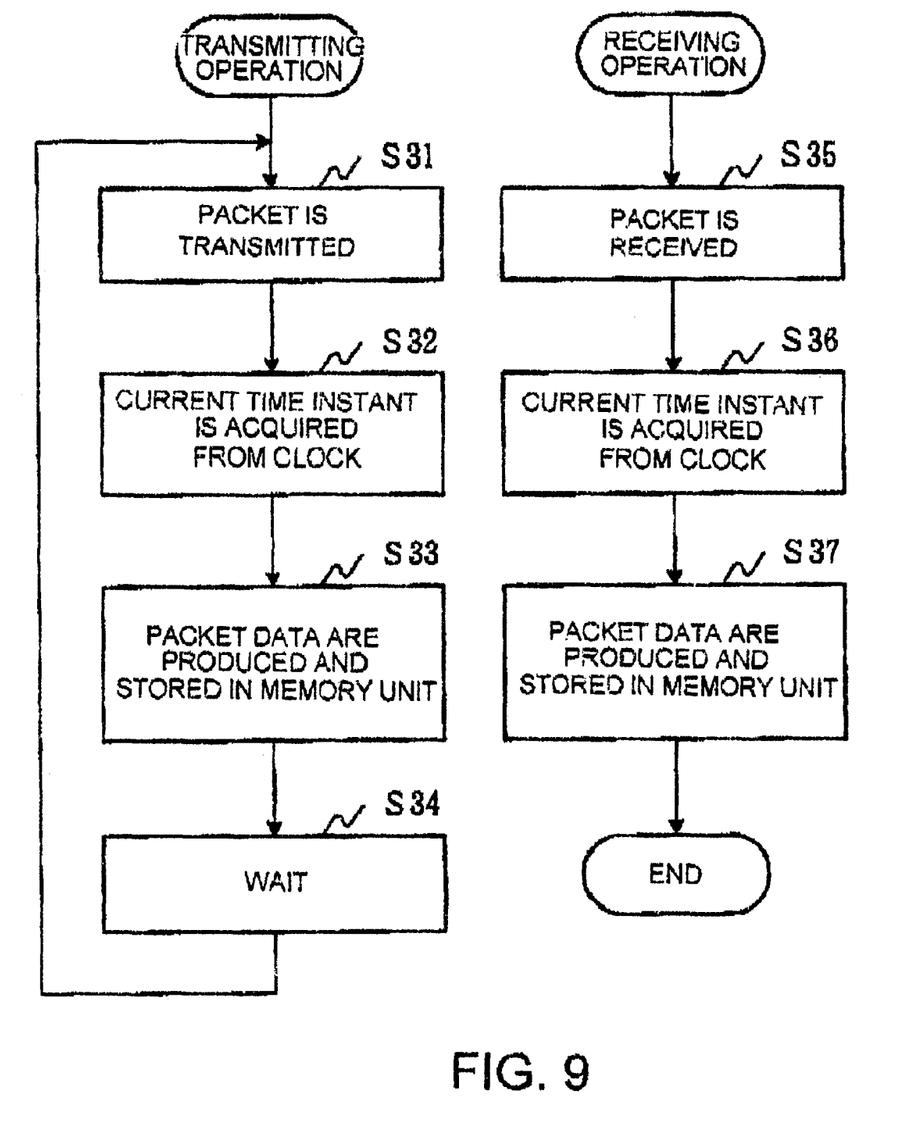
FIG. 9 is a flow chart for describing the operation of packet monitoring terminals illustrated in FIG. 8.

Referring to FIG. 9, the operation of the first and the second packet monitoring terminals 21 and 22 will be described. For execution of the operation illustrated in FIG. 9, a monitoring program is recorded in the recording medium K1 and is read from the recording medium K1 to be loaded into each of the first and the second packet monitoring terminals 21 and 22 when the first and the second packet monitoring terminals 21 and 22 are started up.

When started up, the first and the second packet monitoring terminals 21 and 22 repeatedly and alternately carry out packet transmission to the second and the first packet monitoring terminals 22 and 21 in a predetermined cycle, respectively. Specifically, the first packet monitoring terminal 21 transmits a packet to the second packet monitoring terminal 22 through the first network segment 13, the packet network 10, and the second network segment 14 (step S31). The first packet monitoring terminal 21 acquires from the first clock 51 a current time instant at the time when the packet is transmitted (step S32). The first packet monitoring terminal 21 produces packet data containing the current time instant thus acquired, the designation of the first packet monitoring terminal 21 as a transmission terminal, the designation of the second packet monitoring terminal 22 as a reception terminal, and the packet ID and supplies the packet data to the memory unit 41 for storage therein (step S33). After waiting for a predetermined time period, the operation returns to the step S31 to repeat the abovementioned steps. On the other hand, the second packet monitoring terminal 22 transmits a packet to the first packet monitoring terminal 21 through the second network segment 14, the packet network 10, and the first network segment 13 (step S31). The second packet monitoring terminal 22 acquires from the second clock 52 a current time instant at the time when the packet is transmitted (step S32). The second packet monitoring terminal 22 produces packet data containing the current time instant thus acquired, the designation of the second packet monitoring terminal 22 as a transmission terminal, the designation of the first packet monitoring terminal 21 as a reception terminal, and the packet ID and supplies the packet data to the memory unit 42 for storage therein (step S33). After waiting for a predetermined time period, the operation returns to the step S31 to repeat the abovementioned steps.

When the first and the second packet monitoring terminals 21 and 22 receive the packets from the second and the first packet monitoring terminals 22 and 21 (step 835), respectively, the first and the second packet monitoring terminals 21 and 22 acquire from the first and the second clocks 51 and 52 current time instants at the time when the packets are received (step S36), respectively. The first and the second packet monitoring terminals 21 and 22 produce packet data containing the current time instants thus acquired, the designation of the transmission terminal, the designation of the reception terminal, and the packet ID and supply the packet data to the memory units 41 and 42 for storage therein (step S37), respectively.

The first and the second packet data groups 31 and 32 are processed by the network delay monitoring terminal 20 to produce the delay data group 30 in the manner similar to the embodiment illustrated in FIG. 2.

Figure 10:
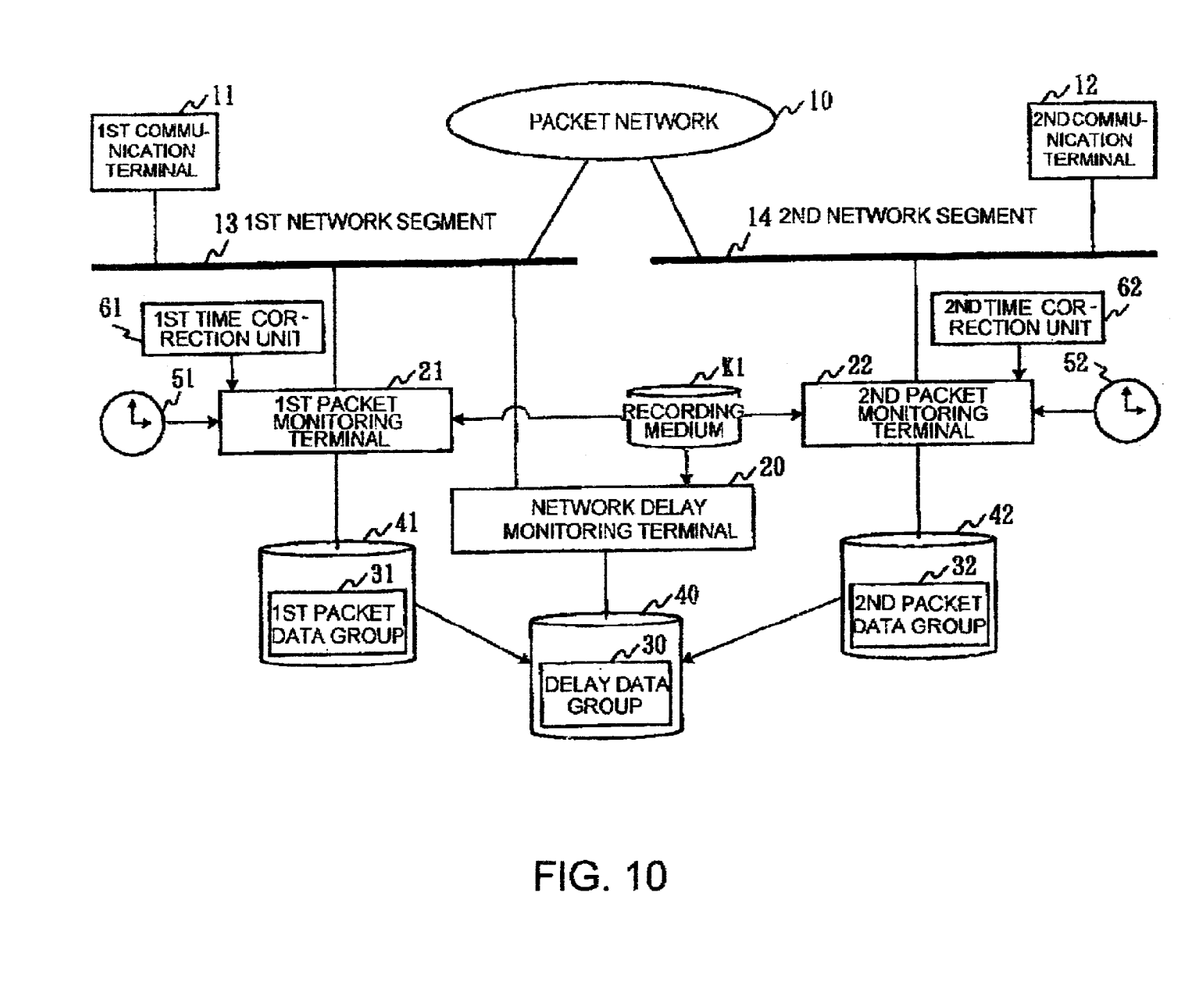
FIG. 10 is a block diagram of still another packet network system to which this invention is applied.

Referring to FIG. 10, still another packet network system to which this invention is applied is similar to that illustrated in FIG. 2 except that the first and the second packet monitoring terminals 21 and 22 further comprise first and second time correction units 61 and 62 for time correction in the first and the second clocks 51 and 52 in response to time correction request from the network delay monitoring terminal 20, respectively.

In this embodiment, the network delay monitoring terminal 20 calculates the time difference α in the manner similar to the embodiment illustrated in FIG. 2 and carries out clock synchronization of the first and the second clocks 51 and 52 so that the time difference α becomes equal to zero. Specifically, it is assumed that the first clock 51 of the first packet monitoring terminal 21 is slow. In this event, the network delay monitoring terminal 20 supplies through the first network segment 13 to the first packet monitoring terminal 21 the time correction request to advance the first clock 51 by a desired value equal to an absolute value of the time difference α. In response to the time correction request, the first time correction unit 61 of the first packet monitoring terminal 21 advances the current time instant in the first clock 51 by the desired value.

According to this embodiment, the correction of the provisional delays is necessary for the packet data groups 31 and 32 detected before the time correction but is unnecessary for the packet data groups 31 and 32 detected after the time correction.

In the foregoing embodiments, the input and the output time instants when the packet enters and leaves the packet network 10 are detected by the terminals. Alternatively, the input and the output time instants may be detected by a processor, such as a packet switching unit, in the packet network 10.

As described above, according to this invention, the transmission delay of the packets flowing through the packet network can be measured individually for each of the forward transmission and the backward transmission without requiring the clock synchronization.

What is claimed is:

1. A transmission delay measuring method which is used in a packet network and which comprises the steps of:

detecting by the use of first and second clocks, for each of first direction-data packets transmitted from a first terminal to a second terminal through said packet network, input and output time instants when each of said first direction-data packets enters and leaves said packet network, respectively;

recording the input and the output time instants for said first direction-data packets as recorded input and recorded output time instants for said first direction-data packets;

detecting by the use of said second and said first clocks, for each of second direction-data packets transmitted from said second terminal to said first terminal through said packet network, input and output time instants when each of said second direction-data packets enters and leaves said packet network, respectively;

recording the input and the output time instants for said second direction-data packets as recorded input and recorded output time instants for said second direction-data packets;

calculating, for each of said first direction-data packets, a first-direction provisional delay which is a first difference given by subtracting, for each of said first direction-data packets, said recorded input time instant from said recorded output time instant;

calculating, for each of said second direction-data packets, a second-direction provisional delay which is a second difference given by subtracting, for each of said second direction-data packets, said recorded input time instant from said recorded output time instant; and deriving a time difference between said first and said second clocks from a first minimum value of said first-direction provisional delays and a second minimum value of said second-direction provisional delays.

2. A method as claimed in claim 1, further comprising the step of correcting said first-direction and said second-direction provisional delays by the use of said time difference.

3. A method as claimed in claim 1, further comprising the step of synchronizing said first and said second clocks by the use of said time difference.

4. A transmission delay measuring method which is used in a packet network and which comprises the steps of:

detecting by the use of first and second clocks, for each of first direction-data packets transmitted from a first communication terminal to a second communication terminal through said packet network, input and output time instants when each of said first direction-data packets enters and leaves said packet network, respectively;

recording the input and the output time instants for said first direction-data packets as recorded input and recorded output time instants for said first direction-data packets;

detecting by the use of said second and said first clocks, for each of second direction-data packets transmitted from said second communication terminal to said first communication terminal through said packet network, input and output time instants when each of said second direction-data packets enters and leaves said packet network, respectively;

recording the input and the output time instants for said second direction-data packets as recorded input and recorded output time instants for said second direction-data packets;

calculating, for each of said first direction-data packets, a first-direction provisional delay which is a first difference given by subtracting, for each of said first direction-data packets, said recorded input time instant from said recorded output time instant;

calculating, for each of said second direction-data packets, a second-direction provisional delay which is a second difference given by subtracting, for each of said second direction-data packets, said recorded input time instant from said recorded output time instant; and deriving a time difference between said first and said second clocks from a first minimum value of said first-direction provisional delays and a second minimum value of said second-direction provisional delays.

5. A method as claimed in claim 4, further comprising the step of correcting said first-direction and said second-direction provisional delays by the use of said time difference.

6. A method as claimed in claim 4, further comprising the step of synchronizing said first and said second clocks by the use of said time difference.

7. A machine-readable recording medium storing a transmission delay measuring program which is used in a packet network and which is for:

detecting by the use of first and second clocks, for each of first direction-data packets transmitted from a first terminal to a second terminal through said packet network, input and output time instants when each of said first direction-data packets enters and leaves said packet network, respectively;

recording the input and the output time instants for said first direction-data packets as recorded input and recorded output time instants for said first direction-data packets;

detecting by the use of said second and said first clocks, for each of second direction-data packets transmitted from said second terminal to said first terminal through said packet network, input and output time instants when each of said second direction-data packets enters and leaves said packet network, respectively;

recording the input and the output time instants for said second direction-data packets as recorded input and recorded output time instants for said second direction-data packets;

calculating, for each of said first direction-data packets, a first-direction provisional delay which is a first difference given by subtracting, for each of said first direction-data packets, said recorded input time instant from said recorded output time instant;

calculating, for each of said second direction-data packets, a second-direction provisional delay which is a second difference given by subtracting, for each of said second direction-data packets, said recorded input time instant from said recorded output time instant;

deriving a time difference between said first and said second clocks from a first minimum value of said first-direction provisional delays and a second minimum value of said second-direction provisional delays; and correcting said first-direction and said second-direction provisional delays by the use of said time difference.

8. A machine-readable recording medium storing a transmission delay measuring program which is used in a packet network and which is for;

detecting by the use of first and second clocks, for each of first direction-data packets transmitted from a first communication terminal to a second communication terminal through said packet network, input and output time instants when each of said first direction-data packets enters and leaves said packet network, respectively;

recording the input and the output time instants for said first direction-data packets as recorded input and recorded output time instants for said first direction-data packets;

detecting by the use of said second and said first clocks, for each of second direction-data packets transmitted from said second communication terminal to said first communication terminal through said packet network, input and output time instants when each of said second direction-data packets enters and leaves said packet network, respectively;

recording the input and the output time instants for said second direction-data packets as recorded input and recorded output time instants for said second direction-data packets;

calculating, for each of said first direction-data packets, a first-direction provisional delay which is a first difference given by subtracting, for each of said first direction-data packets, said recorded input time instant from said recorded output time instant;

calculating, for each of said second direction-data packets, a second-direction provisional delay which is a second difference given by subtracting, for each of said second direction-data packets, said recorded input time instant from said recorded output time instant;

deriving a time difference between said first and said second clocks from a first minimum value of said first-direction provisional delays and a second minimum value of said second-direction provisional delays; and correcting said first-direction and said second-direction provisional delays by the use of said time difference.

9. A transmission delay measuring system for a packet network, comprising:

first packet monitoring means for detecting, by the use of first and second clocks, for each of first direction-data packets transmitted from a first terminal to a second terminal through said packet network, input and output time instants when each of said first direction-data packets enters and leaves said packet network, respectively, said first packet monitoring means being provided on a first network segment of which said first terminal is also provided, said first network segment being communicatively connected to said packet network;

recording means for recording the input and the output time instants for said first direction-data packets as recorded input and recorded output time instants for said first direction-data packets;

second packet monitoring means for detecting, by the use of said second and said first clocks, for each of second direction-data packets transmitted from said second terminal to said first terminal through said packet network, input and output time instants when each of said second direction-data packets enters and leaves said packet network, respectively, said first packet monitoring means being provided on a second network segment of which said first terminal is also provided, said second network segment being communicatively connected to said packet network, wherein said recording means also records the input and the output time instants for said second direction-data packets as recorded input and recorded output time instants for said second direction-data packets;

calculating means for calculating, for each of said first direction-data packets, a first-direction provisional delay which is a first difference given by subtracting, for each of said first direction-data packets, said recorded input time instant from said recorded output time instant, wherein said calculating means also calculates, for each of said second direction-data packets, a second-direction provisional delay which is a second difference given by subtracting, for each of said second direction-data packets, said recorded input time instant from said recorded output time instant, and wherein said calculating means derives a time difference between said first and said second clocks from a first minimum value of said first-direction provisional delays and a second minimum value of said second-direction provisional delays, and wherein said calculating means is not communicatively connected to either the first network segment or the second network segment.

10. A system as claimed in claim 9, further comprising correcting means for correcting said first-direction and said second-direction provisional delays by the use of said time difference.

11. A system as claimed in claim 9, further comprising synchronizing means for synchronizing said first and said second clocks by the use of said time difference.

* * * * *